United States Patent
Askerup et al.

(10) Patent No.: US 11,979,807 B2
(45) Date of Patent: May 7, 2024

(54) AUTOMATIC NOTIFICATIONS FOR EXPIRED SUBSCRIPTIONS

(71) Applicant: HEWLETT PACKARD ENTERPRISE DEVELOPMENT LP, Houston, TX (US)

(72) Inventors: Anders H. Askerup, Plano, TX (US); David C. Williamson, Plano, TX (US); Lu Tian, Plano, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 25 days.

(21) Appl. No.: 17/486,738

(22) Filed: Sep. 27, 2021

(65) Prior Publication Data
US 2023/0033997 A1    Feb. 2, 2023

Related U.S. Application Data

(60) Provisional application No. 63/227,961, filed on Jul. 30, 2021.

(51) Int. Cl.
*H04W 4/60* (2018.01)
*H04L 67/55* (2022.01)
*H04W 4/20* (2018.01)

(52) U.S. Cl.
CPC ............... *H04W 4/60* (2018.02); *H04L 67/55* (2022.05); *H04W 4/20* (2013.01)

(58) Field of Classification Search
CPC ............ H04L 67/55; H04W 4/60; H04W 4/20
See application file for complete search history.

(56) References Cited

U.S. PATENT DOCUMENTS

| | | | | |
|---|---|---|---|---|
| 9,043,928 B1* | 5/2015 | Paczkowski | ........ | G06F 21/6263 726/28 |
| 10,074,115 B1* | 9/2018 | Hynoski | ................. | G06Q 30/04 |
| 10,564,823 B1* | 2/2020 | Dennis | ................... | G06F 21/629 |
| 10,812,600 B1* | 10/2020 | Naaman | ................ | H04L 67/142 |
| 11,075,984 B1* | 7/2021 | Mercier | ................... | H04L 43/20 |
| 2004/0153552 A1* | 8/2004 | Trossen | .................. | H04L 67/55 709/228 |
| 2007/0058832 A1* | 3/2007 | Hug | ........................ | G06F 16/45 381/388 |

(Continued)

FOREIGN PATENT DOCUMENTS

WO    WO-20190034610    2/2019
WO    WO-20190076777    4/2019

(Continued)

*Primary Examiner* — Benjamin M Thieu
(74) *Attorney, Agent, or Firm* — Sheppard Mullin Richter & Hampton LLP

(57) ABSTRACT

Systems and methods are provided for automatic notifications of expired subscriptions. In various embodiments, a network function can request a subscription from a Unified Data Repository (UDR). The request for the subscription can include a request for a notification when the subscription expires or at a time prior to the expiration of the subscription. When the subscription expires or at the time prior to the expiration of the subscription, the UDR can provide a notification that the subscription has expired or is about to expire. Based on the notification, the network function can request to re-subscribe or request a new subscription from the UDR.

20 Claims, 6 Drawing Sheets

(56) References Cited

U.S. PATENT DOCUMENTS

| | | | |
|---|---|---|---|
| 2007/0276737 A1* | 11/2007 | Joao | G07F 17/0014 |
| | | | 705/21 |
| 2008/0091796 A1* | 4/2008 | Story | G06F 3/04842 |
| | | | 709/217 |
| 2008/0288572 A1* | 11/2008 | Galvin, Jr. | H04L 67/55 |
| | | | 709/201 |
| 2013/0282511 A1* | 10/2013 | Mitchell | G06Q 30/0611 |
| | | | 705/26.4 |
| 2014/0236846 A1* | 8/2014 | Melika | H04W 4/50 |
| | | | 705/310 |
| 2016/0315802 A1* | 10/2016 | Wei | H04L 67/55 |
| 2019/0182718 A1 | 6/2019 | Shan | |
| 2019/0254094 A1 | 8/2019 | Babu et al. | |
| 2019/0261260 A1 | 8/2019 | Dao et al. | |
| 2020/0169562 A1* | 5/2020 | Moldoveanu | G06F 9/542 |
| 2020/0228420 A1 | 7/2020 | Dao et al. | |
| 2020/0260401 A1 | 8/2020 | So | |
| 2021/0120388 A1* | 4/2021 | Chastain | H04W 4/60 |
| 2021/0136559 A1* | 5/2021 | Chastain | H04W 60/00 |

FOREIGN PATENT DOCUMENTS

| | | |
|---|---|---|
| WO | WO-20190076801 | 4/2019 |
| WO | WO-20200033697 | 2/2020 |
| WO | WO-WO2020074542 | 4/2020 |

\* cited by examiner

AUTOMATIC NOTIFICATIONS FOR EXPIRED SUBSCRIPTIONS

RELATED APPLICATIONS

This application claims the benefit of and priority to U.S. Provisional Patent Application No. 63/227,961, filed on Jul. 30, 2021, the contents of which is incorporated herein by reference in its entirety.

DESCRIPTION OF RELATED ART

As improvements in wireless technologies have expanded capabilities in wireless devices, such as smart phones, tablets, and laptops, these wireless devices are becoming increasingly used in various industries. Further, these improvements have allowed wireless technologies to compete and, in some cases, overtake conventional wired technologies. In wireless technologies, 5G is a standard promulgated by the International Telecommunication Union (ITU) and the 3rd Generation Partnership Project (3GPP). The ITU sets the minimum requirements for 5G compliance, and the 3GPP creates the corresponding specifications. 5G refers to the fifth generation of wireless broadband technology for digital cellular networks and is a successor to the 4G/Long Term Evolution (LTE) standard. 5G technologies utilize extremely high frequency (EHF), or millimeter wave (mm-Wave), which enables improved connectivity over previous generation 4G networks. In this way, 5G provides greater spectral efficiency and greater spectrum pathways to achieve increased throughput for each part of the spectrum. Advantages of 5G over 4G/LTE include, for example, faster data download and data upload speeds, along with reduced latency (e.g., the time it takes for a device to communicate with a network). Thus, 5G is applied in many improvements in wireless technology.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
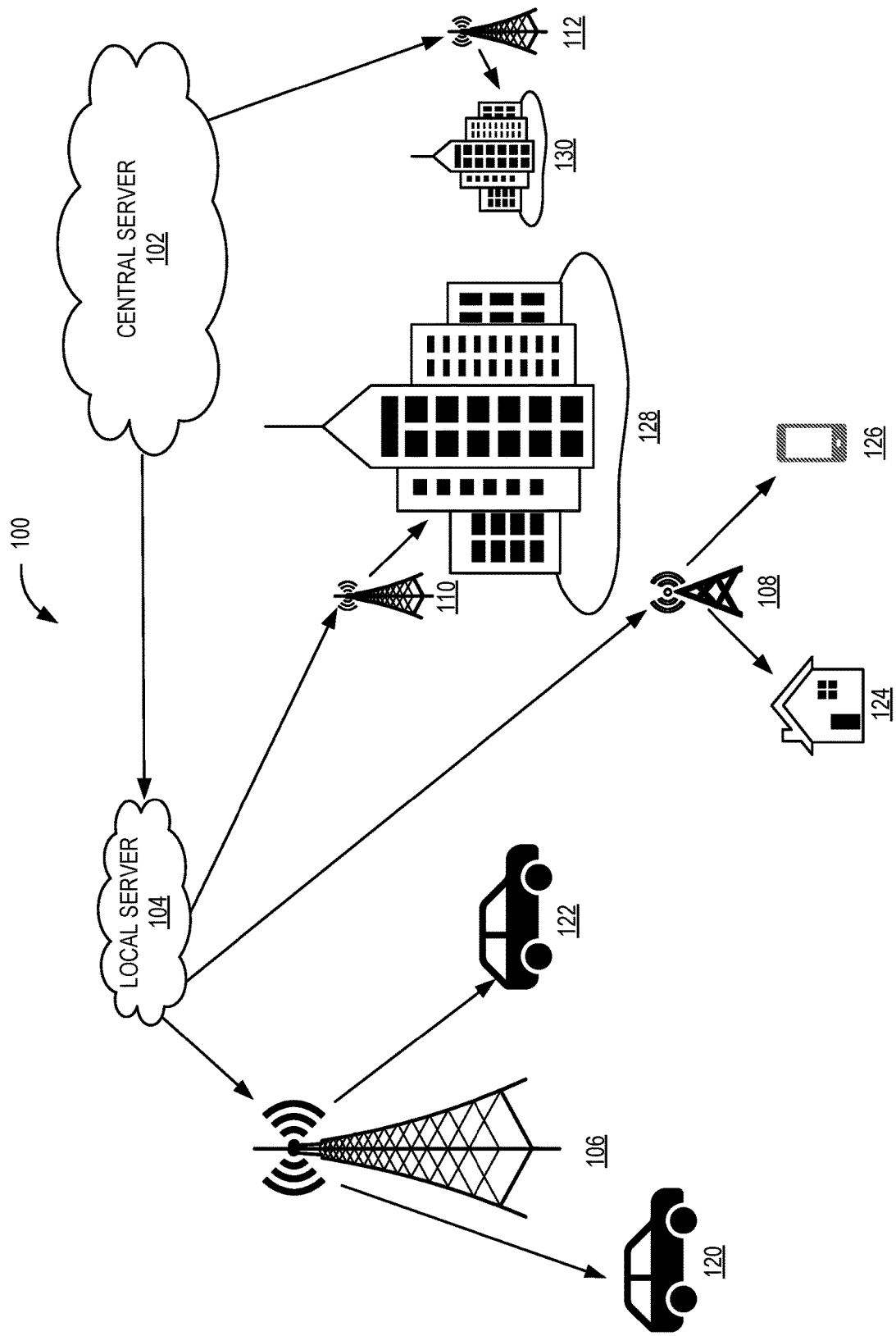
FIG. 1 illustrates an example 5G network in accordance with various embodiments.

The figures are not exhaustive and do not limit the present disclosure to the precise form disclosed.

DETAILED DESCRIPTION

In the 5G standard architecture, a Unified Data Repository (UDR) is a database that stores subscription-related data. This subscription-related data can include, for example, subscription data, policy data, structured data for exposure, and application data. Subscription data can include data related to various services to which a user equipment (UE) is subscribed. This subscription data can be made available to various network functions, such as the Access and Mobility Management Function (AMF), Session Management Function (SMF), Authentication Server Function (AUSF), and the like, through a Unified Data Management (UDM) front end. In other words, various network functions subscribe to subscription data through the UDM. Such subscriptions are often associated with an expiry time after which the subscriptions are no longer valid and the subscription data is no longer available without a new subscription. The use of expiry times with subscriptions avoids orphan subscriptions where a network function is decommissioned or a UE is idle for a long duration.

Technological challenges arise from the use of expiry times with subscriptions in the 5G standard. In the 5G standard architecture, network functions are generally deployed as stateless network functions and do not maintain a state or data associated with the sessions or transactions the network functions process. As such, these stateless network functions cannot independently maintain the expiry times of subscriptions to which they are subscribed. In order for the network functions to know when a subscription has expired or when to re-subscribe to the subscription, the network functions, under the 5G standard, rely on separate data functions, such as the Unstructured Data Storage Function (UDSF). However, these separate data functions require extraneous processing and additional storage. Further, the processing and storage required by these separate data functions are redundant to the capabilities of the UDR that provide the subscriptions and subscription data. These challenges are exacerbated in cases where the network functions maintain multiple subscriptions. Thus, reliance on these separate data functions is inefficient and redundant.

Accordingly, disclosed are systems and methods for providing automatic notifications of expired subscriptions. In various embodiments, the Service Based Interface (SBI) of the UDR in the 5G standard can be modified to facilitate a request for an automatic notification upon expiration of a subscription. With the modified SBI, a network function can request to subscribe to subscription data and request for a notification upon expiry of the subscription. The network function can make these requests through a UDM, which in turn negotiates the subscription for the applicable subscription data with the UDR and requests for notification upon expiry of the negotiated subscription. When the subscription expires, or within a threshold period of time before the subscription expires, the UDR can provide a notification to the network function through the UDM. The notification can indicate to the network function that the subscription expired and, therefore, to request a new subscription (e.g., re-subscribe) for the subscription data. The network function can request a new subscription based on the notification. In this way, the network function can avoid lapses in a subscription without using a separate data function to track the expiry time of the subscription. As an example, an Access and Mobility Management Function (AMF) can request to subscribe to be notified of profile data updates for a UE. The profile data can be subscription data maintained in a UDR. A UDM facilitates the request to subscribe from the AMF and negotiates a subscription with the UDR. For example, the AMF may request a 24 hour subscription for profile data updates and the UDR may respond with a 12 hour subscription for the profile data updates. A request for notification of expiration of the subscription can be included in the original request to subscribe. The UDR can respond with confirmation that a notification of expiration of the subscription will be provided at an expiry time of the subscription. When the subscription expires, for example, at the end of the 12 hour subscription, the UDR can provide a notification to the AMF that the subscription for profile data updates has expired. The AMF can request a new subscription based on the notification and avoid a lapse in the subscription for profile data updates without relying on a separate data function.

Before describing embodiments of the disclosed systems and methods in detail, it may be useful to describe an example 5G network with which these systems and methods might be implemented in various applications. FIG. 1 illustrates an example 5G network 100 with which various embodiments of the disclosed systems and methods may be implemented. In general, the example 5G network may be described as comprising two component networks, the radio access network (RAN) and the core network.

The RAN of the example 5G network may include various infrastructure, such as base stations, cell towers, masts, in-home infrastructure, in-building infrastructure, and the like. The RAN allows users of mobile devices, which can also be referred to as user equipment (UE), to connect to the core network. Examples of UE include smartphones, tablet computers, laptops, vehicle-implemented communication devices (e.g., vehicles having vehicle-to-vehicle capabilities), and the like. FIG. 1 illustrates a plurality of 5G small base stations or small cells (e.g., 5G small cell 108) and 5G macro base stations or macro cells (e.g., 5G macro cells 106, 110, and 112).

Macro cells can refer to base stations/cell towers that are able to maintain network signal strength across long/large distances. These base stations/cell towers are sometimes referred to as "macro" base stations or "macro" cell towers. 5G macro cells may use multiple input, multiple output (MIMO) antennas that may have various components that allow data to be sent and/or received simultaneously. In the example 5G network 100 of FIG. 1, 5G macro cell 106 may provide wireless broadband coverage/communications to vehicles 120 and 122. 5G macro cell 110 may provide broadband service to an area, such as a city or municipality 128. Likewise, 5G macro cell 112 may provide broadband coverage to an area, such as a city or municipality 130. The MIMO antennas used by 5G macro cells may comprise large numbers of antenna elements, which can be referred to as massive MIMO, whose size may be comparable to those of, for example, 3G or 4G base station antennas.

5G small cells can refer to wireless transmitters/receivers implemented as micro base stations designed to provide coverage to areas smaller than those afforded coverage by 5G macro cells. 5G small cells can provide coverage, for example, on the order of about 100 meters (m) to 200 m for outdoor 5G small cells. Indoor 5G small cell deployments may provide coverage on the order of about 10 m. 5G small cells can be mounted or integrated in various places, such as onto street lights, utility poles, buildings, and the like. Like 5G macro cells, 5G small cells may also leverage massive MIMO antennas. In the example 5G network 100 of FIG. 1, 5G small cell 108 provides broadband coverage to a house 124 and smartphone 126.

The core network may comprise the mobile exchange and data network used to manage the connections made to/from/via the RAN. As illustrated in FIG. 1, the core network of 5G network 100 may include central server 102 and local server 104. Central server 102 is shown to effectuate broadband service to area 130 by way of 5G macro cell 112. Central server 102 may also operatively connect to local server 104, which in turn, provides broadband connectivity by way of 5G macro cells 106 and 110, as well as 5G small cell 108. The use of distributed servers, such as local server 104, can improve response times, thereby reducing latency. The core network may leverage network function virtualization (e.g., instantiation of network functions using virtual machines via the cloud rather than hardware) and network slicing (e.g., segmentation of 5G network 100 in accordance with a particular application, industry, or other criteria) to provide these lower response times, and provide faster connectivity.

Figure 2:
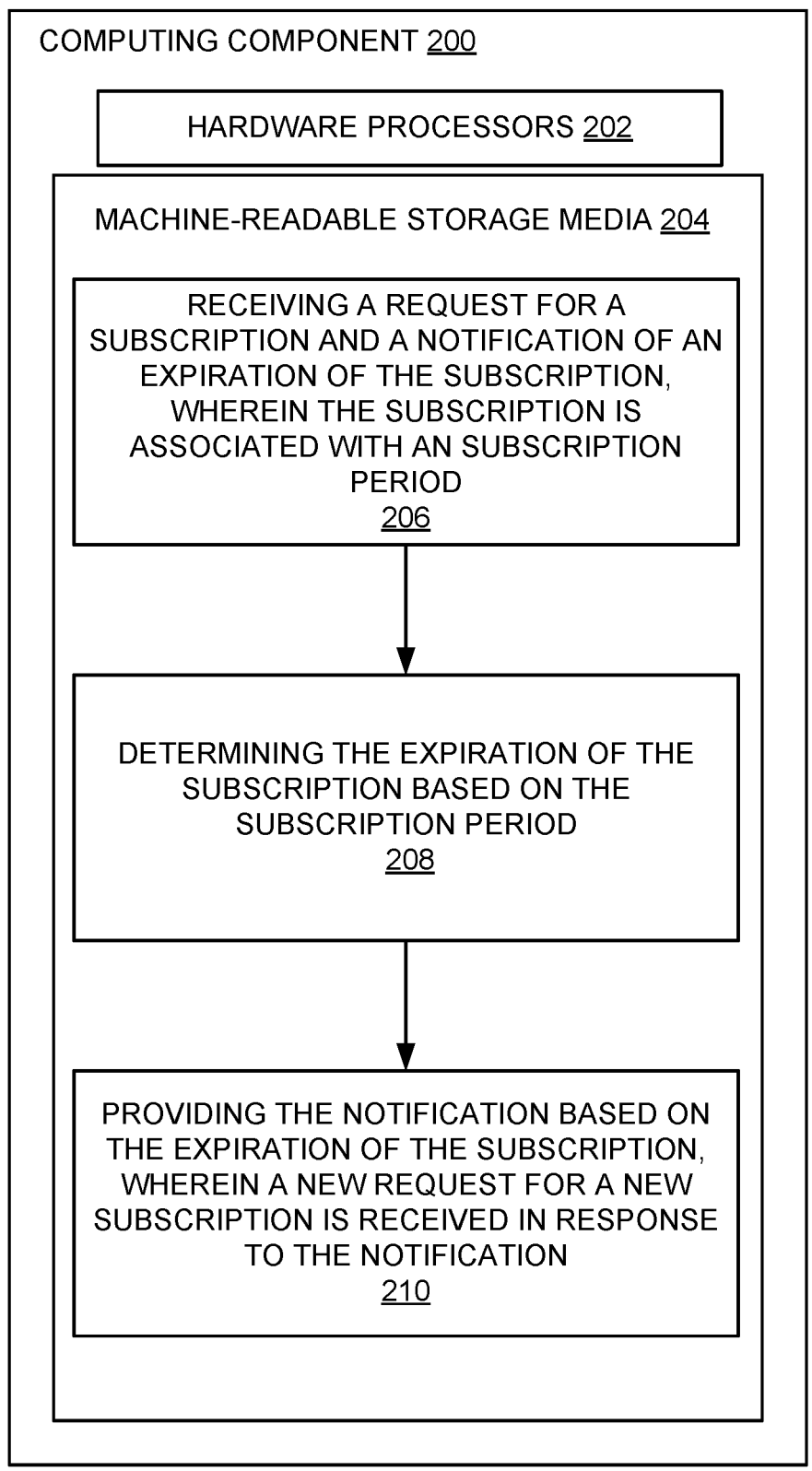
FIG. 2 is an example computing component that may be used to implement automatic notifications for expired subscriptions in accordance with various embodiments.

FIG. 2 illustrates an example computing component that may be used to implement automatic notifications for expired subscriptions, in accordance with various embodiments. Referring now to FIG. 2, computing component 200 may be, for example, a server computer, a client device, a controller, or any other similar computing component capable of processing data. In the example implementation of FIG. 2, the computing component 200 includes a hardware processor 202 and machine-readable storage medium 204.

Hardware processor 202 may be one or more central processing units (CPUs), semiconductor-based microprocessors, and/or other hardware devices suitable for retrieval and execution of instructions stored in machine-readable storage medium 204. Hardware processor 202 may fetch, decode, and execute instructions, such as instructions 206-210, to control processes or operations for providing a user interface for surfacing action items. As an alternative or in addition to retrieving and executing instructions, hardware processor 202 may include one or more electronic circuits that include electronic components for performing the functionality of one or more instructions, such as a field programmable gate array (FPGA), application specific integrated circuit (ASIC), or other electronic circuits. Instructions 206-210 can allow for automatic notifications for expired subscriptions. Although instructions 206-210 are shown, it can be understood that the instructions can be performed in any order, without some of the instructions shown, and/or with the inclusion of other instructions not shown, and the instructions would still fall within the scope of the disclosure.

A machine-readable storage medium, such as machine-readable storage medium 204, may be any electronic, magnetic, optical, or other physical storage device that contains or stores executable instructions. Thus, machine-readable storage medium 204 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 204 may be a non-transitory storage medium, where the term "non-transitory" does not encompass transitory propagating signals. As described in detail below, machine-readable storage medium 204 may be encoded with executable instructions, for example, instructions 206-210, for automatic notifications for expired subscriptions.

Hardware processor 200 may execute instruction 206 to receive a request for a subscription and a notification of an expiration of the subscription, wherein the subscription is associated with a subscription period. In various embodiments, a network function, or other function or service, can request a subscription for data. The request can be received by a data repository (or other network function or network service that uses a subscription mechanism), such as a Unified Data Repository (UDR). In some cases, the transmission and receipt of the request can be facilitated by a Unified Data Management (UDM) front end. In such cases, the network function can provide a request for a subscription to the UDM, and the UDM negotiates a subscription with the UDR on behalf of the network function. For example, the UDM can negotiate a subscription period associated with a subscription. The subscription period can be a period of time for which the subscription is valid. An expiry time associated with the subscription can be a time at which the subscription becomes invalid or expires (e.g., at the end of the period of time for which the subscription is valid). In some cases, a subscription can be associated with a maximum threshold period of time or a maximum subscription period. The maximum subscription period for a subscription can be maintained in the UDR. In response to a request for a subscription that exceeds the maximum subscription period, the UDR can provide a response indicating an expiry time for the requested subscription corresponding with the maximum subscription period. For example, a network function, such as an Access and Mobility Management Function (AMF) can request a subscription for notifications when changes are made to a user equipment (UE) configuration. The request for the subscription can include a request for a month subscription period. The request for the subscription can be provided to a UDR that maintains UE configurations. The request can be provided to the UDR through a UDM that negotiates the subscription. In this example, the UDR can maintain a maximum subscription period of one week for subscriptions related to UE configurations. In response to the request for the subscription, the UDR can provide an expiry time indicating that the subscription has an expiry time of one week from when the request for the subscription was made. The UDR also maintains the expiry time provided to the AMF and will stop providing notifications of changes to UE configurations after the expiry time if the AMF does not request a new subscription. As illustrated in this example, the AMF, without an automatic notification for expired subscriptions, would require a separate service to maintain the expiry time, which would require additional processing and storage and, further, be redundant with the expiry time maintained in the UDR.

In various embodiments, a request for a subscription can be encapsulated in a structured data object. The structured data object can facilitate communication of different attributes associated with the subscription. For example, the structured data object can include a callback reference that identifies a network function for which the subscription was requested. The structured data object can include a user id that identifies a user associated with the subscription. The structured data object can include a resource list that identifies a set of resources for which a change would trigger a notification while the subscription is valid. The structured data object can include a subscription ID to identify the subscription. Additionally, as described above, the structured data object can include an expiry time that indicates when the subscription expires. Many variations are possible.

In various embodiments, a network function, or other function or service, can request a notification of an expiration of a subscription along with a request for a subscription for data. The request for the notification and the subscription for data can be received by a data repository, such as a UDR. In some cases, the transmission and receipt of the request for the subscription and for the notification can be facilitated by a UDM front end. In such cases, the network function can provide a request for a subscription for data and a notification of an expiration of the subscription to the UDM, and the UDM can negotiate a subscription period associated with the subscription as well as negotiate a notification for an expiration of the subscription. With regard to the notification for the expiration of the subscription, the UDM can negotiate a time at which the notification is provided. For example, the UDM can negotiate for a notification that a subscription is about to expire at 120 seconds before the expiry time of the subscription. In response to a request for a notification of an expiration of a subscription, the UDR can provide a response confirming that a notification will be sent. The response can include a time at which the notification will be sent, such as a set time before an expiry time of the subscription. For example, a network function can request a subscription for notifications when changes are made to a set of UE profiles. In the request for the subscription, the network function can also request that a notification that the subscription will expire at 60 seconds before the expiry time of the subscription. In this example, the network function can determine that 60 seconds is sufficient to request a new subscription without a lapse between the subscription and the new subscription. The request for the subscription and the notification of the expiration of the subscription can be provided to a UDM that negotiates the subscription and the notification with a UDR associated with the set of UE profiles. The request can be provided to the UDR as parts of a structured data object. In response to the request in the structured data object, the UDR can provide an expiry time indicating when the subscription will expire and a notification time indicating a time before the expiry time when a notification of the expiration of the subscription will be provided. As the UDR confirms that a notification of the expiration of the subscription will be provided, the network function does not require a separate service to maintain the expiry time and, instead, the network function can wait for the notification of the expiration and request a new subscription when the notification is received.

In various embodiments, a request for a notification of an expiration of a subscription can be included in a structured data object along with a request for a subscription, such as the structured data object described above. The structured data object can include information of various attributes associated with the subscription. With regard to the request for the notification of an expiration of a subscription, the structured data object can include a request for notification value that stores an integer, or other numerical data type, that indicates an amount of time (e.g., seconds, minutes, hours) prior to an expiry time of a subscription to provide the notification that the subscription is expired. The request for notification value can also indicate whether a request for notification is requested. For example, a zero value can indicate that no notification of an expired subscription is requested. A non-zero value can indicate that a notification of an expired subscription is requested, along with the amount of time prior to expiration at which to provide the notification. Many variations are possible.

Hardware processor 200 may execute instruction 208 to determine the expiration of the subscription based on the subscription period. In various embodiments, the expiration of the subscription can be determined by a data registry (or other network function or network service that uses a subscription mechanism), such as a UDR. In some cases, the expiration of a subscription can be determined based on a requested subscription period. In some cases, the expiration of a subscription can be determined based on a maximum subscription period. For example, a network function can request a subscription to subscription data maintained by a UDR. The network function can request a subscription period for the subscription. If the requested subscription period does not exceed a maximum subscription period associated with the subscription data, the UDR can respond to the request for the subscription with a confirmation that the subscription will remain valid for the requested subscription period. If the requested subscription period exceeds the maximum subscription period associated with the subscription data, the UDR can respond to the request for the subscription with an indication that the subscription will remain valid for the maximum subscription period. After the UDR determines the subscription period for a requested subscription, the UDR can maintain an expiry time for the requested subscription based on the subscription period. The expiry time for the requested subscription can correspond with a time when the requested subscription expires. The UDR can maintain an expiry time for each valid subscription. While a subscription is valid, the UDR can provide a service associated with the subscription, such as notifications of changes to subscriber data. After the subscription expires and becomes invalid, the UDR ceases the service associated with the subscription.

In the 5G standard, the UDR maintains an array of subscriptions requested by network functions. The array of subscriptions requested can include expiry times and other attributes associated with the subscriptions requested by network functions. To accommodate the maintenance of expiry times of subscriptions, the UDR can be modified to maintain an array of expiring subscriptions. The array of expiring subscriptions can correspond with the array of subscriptions requested by network functions and include expiry times associated with the subscriptions requested by network functions. Many variations are possible.

Hardware processor 200 may execute instruction 210 to provide the notification based on the expiration of the subscription, wherein a new request for a new subscription is received in response to the notification. In various embodiments, the notification can be provided by a data registry (or other network function or network service that uses a subscription mechanism), such as a UDR. In some cases, the notification can be provided at an expiry time of a subscription. When the subscription expires, the UDR can send the notification indicating that the subscription has expired. In some cases, the notification can be provided at a time prior to the expiry time of the subscription. At the time prior to the expiry time of the subscription, the UDR can send the notification indicating that the subscription is about to expire at the expiry time. A request to re-subscribe or a request for a new subscription can be made based on the notification. For example, in response to receiving a notification that a subscription is about to expire or that the subscription is expired, a network function can provide a new request for a new subscription. In some cases, a request to re-subscribe or a request for a new subscription can be facilitated by a UDM. For example, a network function can request for a subscription that is automatically renewed with a UDR. A UDM can facilitate the request with the UDR. The UDR can respond with a maximum subscription period associated with the subscription. The UDM can request for a notification when the subscription is about to expire. When the UDR provides the notification, the UDM can automatically re-subscribe or request a new subscription with the UDR.

Figure 3:
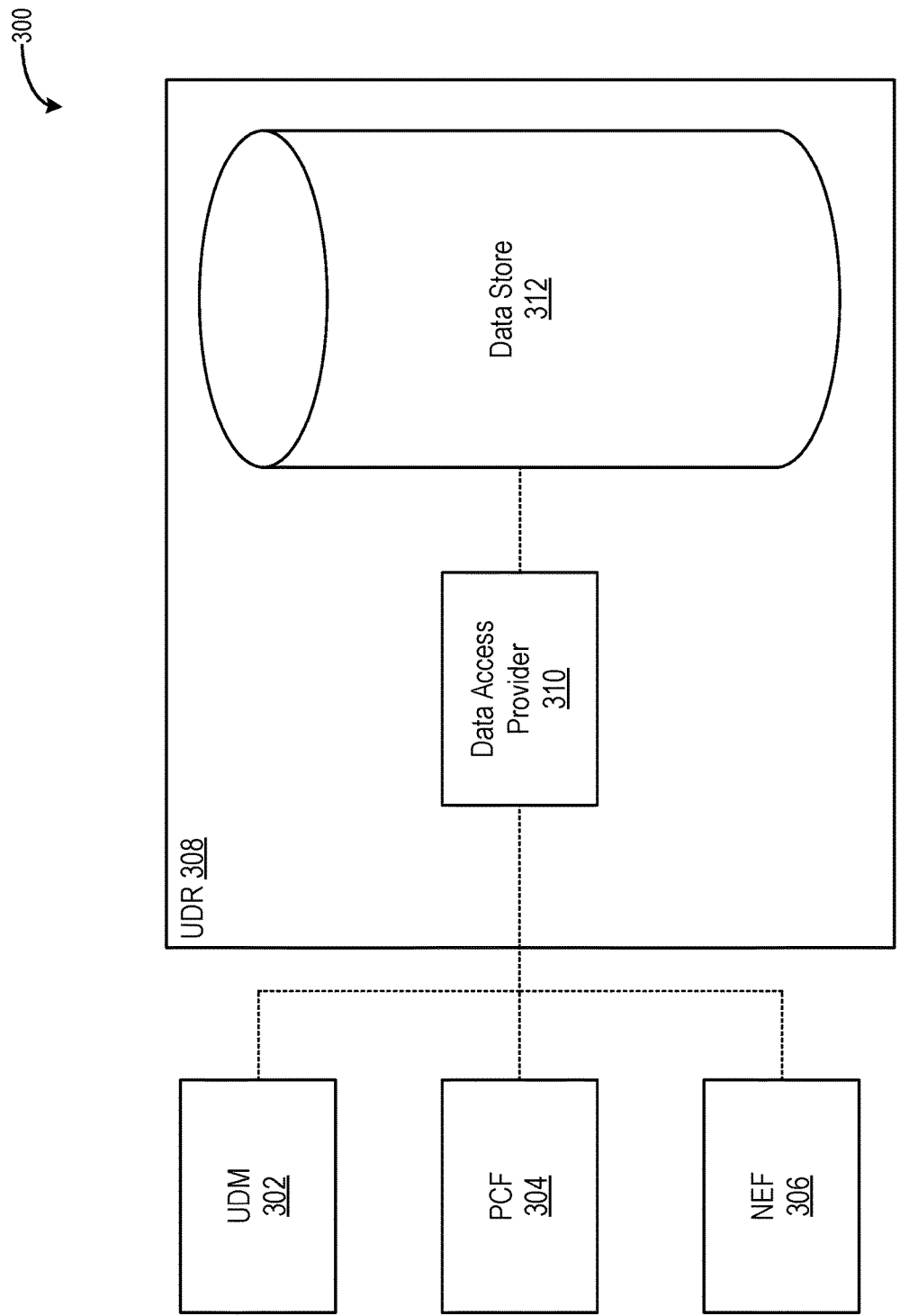
FIG. 3 illustrates an example system that may be used to implement automatic notifications for expired subscriptions in accordance with various embodiments.

FIG. 3 illustrates an example system 300 that may be used to implement automatic notifications for expired subscriptions in accordance with various embodiments. As illustrated in FIG. 3, the example system 300 includes a Unified Data Management (UDM) 302. In general, the UDM 302 manages data as a centralized element. The UDM 302 can facilitate communication between a Unified Data Repository (UDR) 308 and various network functions that provide various services to a user equipment (UE). For example, the UDM 302 can manage data for access authorization, user registration, and data network profiles. In some cases, the UDM 302 can function as a stateless UDM. As a stateless UDM, the UDM 302 requires external services to store data. For example, as a stateless UDM, the UDM 302 can store user information in the UDR 308 and retrieve the data to send it to other network functions. In some cases, the UDM 302 can function as a stateful UDM that stores data locally. In general, a stateless architecture, which may employ stateless UDMs, provide stability and flexibility by separating network operations from database access. As illustrated in FIG. 3, the example system 300 includes a Policy Control Function (PCF) 304. The PCF 304 can interact with various network functions to manage authorization, administration, and control of user resources. For example, the PCF 304 can manage allocation of user resources between the various network functions. In some cases, the PCF 304 can use data stored in the UDR 308 for these purposes. For example, the PCF 304 can use user policy data associated with UEs to determine how to allocate resources among the UEs. Similar to the UDM 302, the PCF 304 may rely on subscriptions to access data stored in the UDR 308. Accordingly, the various disclosures herein related to automatic notifications for expired subscriptions are applicable to PCFs, such as the PCF 304. As illustrated in FIG. 3, the example system 300 includes a Network Exposure Function (NEF) 306. The NEF 306 can facilitate secure access to network functions from external, or third party, applications. The NEF 306 can facilitate secure access by exposing certain network functions to external applications and hiding network functions from the external applications. In some cases, the NEF 306 can use data stored in the UDR 308 for these purposes. For example, the NEF 306 can use user policy data to determine which UEs have access to which network functions. Similar to the UDM 302, the NEF 306 may rely on subscriptions to access data stored in the UDR 308. Accordingly, the various disclosures herein related to automatic notifications for expired subscriptions are applicable to NEFs, such as the NEF 306. Various network functions and network services may use subscription mechanisms, and the various disclosures herein are applicable to these network functions and network services. As illustrated in FIG. 3, the example system 300 includes a UDR 308. The UDR 308 includes a data access provider 310 and a data store 312. The data store 312 of the UDR 308 can store various subscription-related data. For example, the data store 312 can include subscription data, policy data, structured data for exposure, and application data. The data in the data store 312 can be made available to various services through the data access provider 310. The data access provider 310 can identify services based on whether the services have a valid subscription to data in the data store 312. The data access provider 310 can negotiate and provide subscriptions to the data in the data store 312. In various embodiments, the data access provider 310 can provide a notification when a subscription is about to expire. The notification can allow the subscription to be renewed by re-subscribing or by negotiating a new subscription.

Figure 4A:
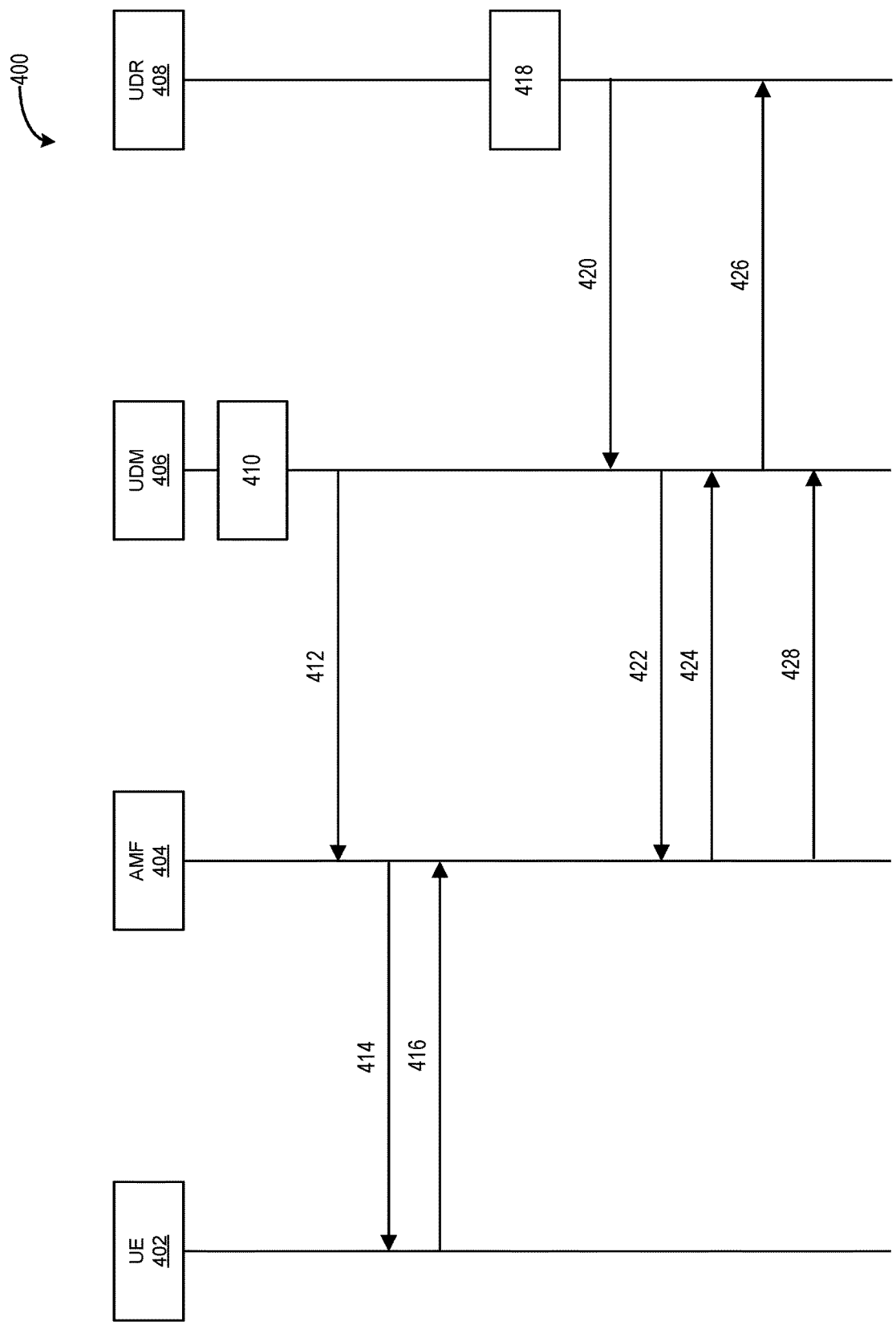
FIG. 4A-4B illustrate example flows involving automatic notifications for expired subscriptions in accordance with various embodiments.
Figure 4B:
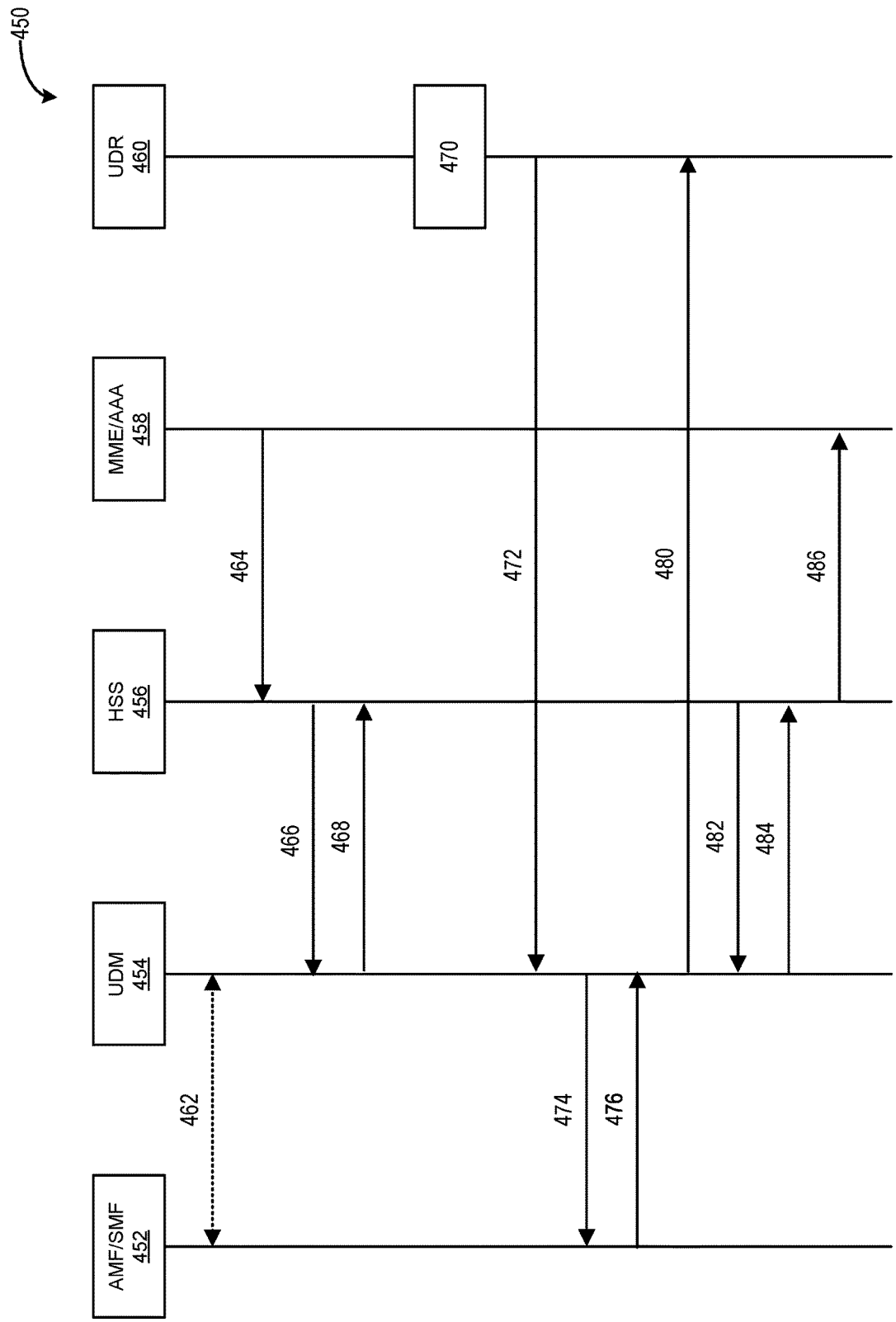

FIG. 4A-4B illustrate example flows associated with automatic notifications for expired subscriptions in accordance with various embodiments. The example flows can be associated with one or more functionalities performed by, for example, the example computing component 200 of FIG. 2. It should be understood that there can be additional, fewer, or alternative steps performed in similar or alternative orders, or in parallel, based on the various features and embodiments discussed herein unless otherwise stated.

FIG. 4A illustrates an example flow 400 associated with automatic notifications for expired subscriptions in accordance with various embodiments. The example flow 400 illustrates an update of user equipment (UE) parameters through a Unified Data Management (UDM) front end. As illustrated in FIG. 4A, the example flow 400 involves a UE 402, an Access and Mobility Management Function (AMF) 404, a UDM 406, and a Unified Data Repository (UDR) 408. At step 410, the UDM 406 determines a UE parameter update is needed based on, for example, a change in subscription data in the UDR 408. At step 412, the UDM 406 notifies the AMF 404 of the UE parameter update. The notification can be provided based on a valid subscription between the AMF 404 and the UDR 408 for the subscription data in the UDR 408. At step 414, the AMF 404 sends a message to the UE 402 with the updated UE parameters. At step 416, the UE 402 sends a message to the AMF 404 acknowledging receipt of the updated UE parameters. At step 418, the UDR 408 determines that the subscription between the AMF 404 and the UDR 408 for the subscription data has expired. At step 420, the UDR 408 sends a notification to the UDM 406 that the subscription has expired. The notification can be sent, for example, based on a request for notifications of expired subscriptions from the AMF 404 when the subscription for subscription data was requested. At step 422, the UDM 406 notifies the AMF 404 that the subscription has expired. At step 424, the AMF 404 sends the UDM 406 a request for a new subscription for the subscription data. At step 426, the UDM negotiates the new subscription for the subscription data with the UDR 408 on behalf of the AMF 404. At step 428, the AMF 404 sends a message to the UDM 406 that the UE 402 has acknowledged receipt of the updated UE parameters and updated accordingly. The message can be sent based on a valid subscription between the AMF 404 and the UDR 408. As illustrated in this example, automatic notifications of expired subscriptions allowed the update of UE parameters to progress efficiently even though the subscription between the AMF 404 and the UDR 408 expired during the update.

FIG. 4B illustrates an example flow 450 associated with automatic notifications for expired subscriptions in accordance with various embodiments. The example flow 450 illustrates a continuation of user equipment (UE) connectivity between mobile systems. As illustrated in FIG. 4B, the example flow 450 involves an Access and Mobility Management Function/Session Management Function (AMF/SMF) 452, a Unified Data Management (UDM) 454 front end, a Home Subscriber Server (HSS) 456, a Mobility Management Entity/Authentication, Authorization and Accounting (MME/AAA) 458, and a Unified Data Repository (UDR) 460. At step 462, the AMF/SMF 452 and the UDM 454 maintain continuity data for a first UE while it is connected to a first mobile system. The continuity data can supporting for interworking with other mobile systems. The continuity data can be stored, for example, in the UDR 460 and provided as part of a valid subscription between the AMF/SMF 452 and the UDR 460. At step 464, the HSS 456 receives a request from the MME/AAA 458. The request can originate from, for example, a second UE on a second mobile system. At step 466, the HSS 456 can request continuity data related to the UE's capabilities with regard to the second mobile system. In some cases, the requested subscription information can be provided based on a valid subscription between the HSS 456 and the UDR 460. At step 468, the UDM 454 provides the continuity data to the HSS 456. The continuity data can indicate that the first UE supports interworking with the second mobile system. At step 470 the UDR 460 determines that the subscription between the AMF/SMF 452 and the UDR 460 for the associations for the first UE has expired. At step 472, the UDR 460 sends a notification to the UDM 454 that the subscription has expired. The notification can be sent, for example, based on a request for notifications of expired subscriptions from the AMF/SMF 452 when the subscription for the associations for the first UE was requested. At step 474, the UDM 454 notifies the AMF/SMF 452 that the subscription has expired. At step 476, the AMF/SMF 452 sends the UDM 454 a request for a new subscription for the subscription data. At step 480, the UDM 454 negotiates the new subscription for the subscription data with the UDR 460 on behalf of the AMF/SMF 452. At step 482, the HSS 456 requests a subscription for notifications of changes to the continuity data associated with the first UE. At step 484, the UDM 454 can confirm the subscription for notifications of changes to the continuity data. At step 486, the HSS 456 can respond to the request from the MME/AAA 458 with the continuity data associated with the first UE. This can facilitate interconnectivity between the first UE and the second UE between the first mobile system and the second mobile system. As illustrated in this example, automatic notifications of expired subscriptions allowed the continuity data associated with the first UE to be provided efficiently even though the subscription between the AMF/SMF 458 and the UDR 460 expired during the update.

Figure 5:
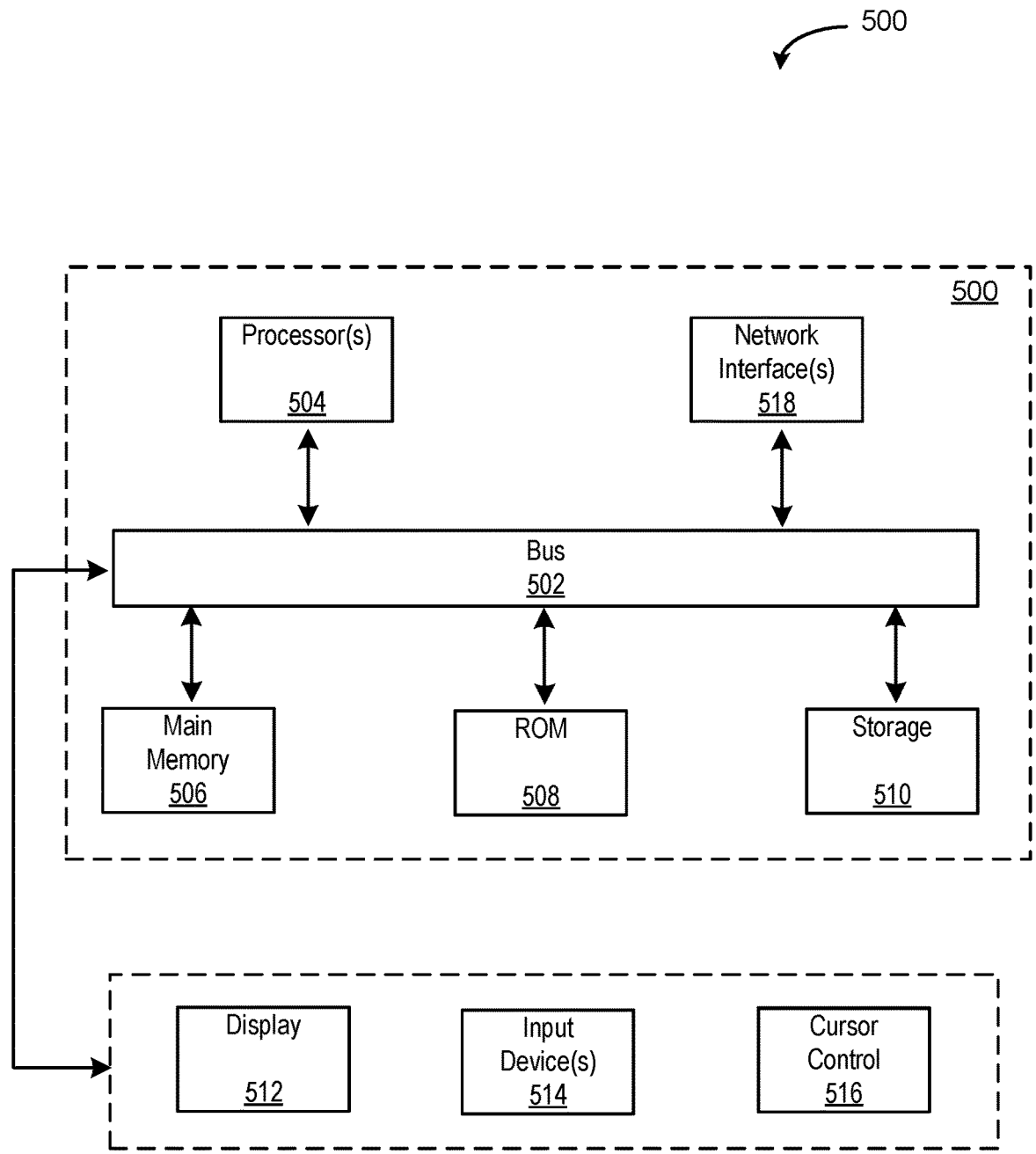
FIG. 5 is an example computing component that may be used to implement various features of embodiments described in the present disclosure.

FIG. 5 depicts a block diagram of an example computer system 500 in which various of the embodiments described herein may be implemented. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computer system 500 may be coupled via bus 502 to a display 512, such as a liquid crystal display (LCD) (or touch screen), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. In some embodiments, the same direction information and command selections as cursor control may be implemented via receiving touches on a touch screen without a cursor.

The computing system 500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

The computer system 500 also includes a communication interface 518 coupled to bus 502. Network interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, network interface 518 may be a local area network (LAN) card to provide a data communication connection to a compatible LAN (or WAN component to communicated with a WAN). Wireless links may also be implemented. In any such implementation, network interface 518 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 518, which carry the digital data to and from computer system 500, are example forms of transmission media.

The computer system 500 can send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 500.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A method comprising:
    receiving, by a network function deployed in a wireless network system, a request for a subscription and a notification of an expiration of the subscription, wherein the subscription is associated with a subscription period, and wherein the network function comprises a stateless network function which does not maintain expiration times of subscriptions to which the stateless network function is subscribed;
    determining, by the network function, the expiration of the subscription based on the subscription period;
    providing, by the network function, the notification based on the expiration of the subscription and further based on the received request for the notification of the expiration of the subscription; and
    receiving a new request for a new subscription in response to providing the notification.

2. The method of claim 1, wherein the request for the subscription and the notification of the expiration of the subscription is received from a network function through a front end, wherein the subscription period is negotiated with the front end, and wherein the notification is provided to the network function through the front end.

3. The method of claim 1, wherein the request for the subscription and the notification of the expiration of the subscription exceeds a maximum subscription period associated with the subscription, and wherein the subscription period is based on the maximum subscription period associated with the subscription.

4. The method of claim 1, further comprising:
    providing, by the network function, notifications associated with changes to subscription-related data corresponding to the subscription during the subscription period, wherein notifications are not provided after the expiration of the subscription.

5. The method of claim 1, wherein the notification is provided at a time prior to the expiration of the subscription, and wherein the time prior to the expiration of the subscription is set based on the request for the subscription.

6. The method of claim 1, wherein the request for the subscription and the notification of the expiration of the subscription are included in a structured data object.

7. The method of claim 1, wherein the network function uses a subscription mechanism.

8. A system, comprising:
    a processor; and
    a memory operatively connected to the processor, and including computer code that when executed, causes the system to:
        receive, by a network function deployed in a wireless network system, a request for a subscription and a notification of an expiration of the subscription, wherein the subscription is associated with a subscription period, and wherein the network function comprises a stateless network function which does not maintain expiration times of subscriptions to which the stateless network function is subscribed;
        determine the expiration of the subscription based on the expiration period;
        provide the notification based on the expiration of the subscription and further based on the received request for the notification of the expiration of the subscription; and
        receive a new request for a new subscription in response to providing the notification.

9. The system of claim 8, wherein the request for the subscription and the notification of the expiration of the subscription is received from a network function through a front end, wherein the subscription period is negotiated with the front end, and wherein the notification is provided to the network function through the front end.

10. The system of claim 8, wherein the request for the subscription and the notification of the expiration of the subscription exceeds a maximum subscription period associated with the subscription, and wherein the subscription period is based on the maximum subscription period associated with the subscription.

11. The system of claim 8, wherein the computer code further causes the system to:
    provide notifications associated with subscription-related data corresponding to the subscription during the subscription period, wherein notifications are not provided after the expiration of the subscription.

12. The system of claim 8, wherein the notification is provided at a time prior to the expiration of the subscription, and wherein the time prior to the expiration of the subscription is set based on the request for the subscription.

13. The system of claim 8, wherein the request for the subscription and the notification of the expiration of the subscription are included in a structured data object.

14. The system of claim 8, wherein the system uses a subscription mechanism.

15. A non-transitory computer-readable storage medium including instructions that, when executed by at least one processor of a computing system, cause the computing system to:
   receive, by a network function deployed in a wireless network system, a request for a subscription and a notification of an expiration of the subscription, wherein the subscription is associated with a subscription period, and wherein the network function comprises a stateless network function which does not maintain expiration times of subscriptions to which the stateless network function is subscribed;
   determine the expiration of the subscription based on the expiration period;
   provide the notification based on the expiration of the subscription and further based on the received request for the notification of the expiration of the subscription; and
   receive a new request for a new subscription in response to providing the notification.

16. The non-transitory computer-readable storage medium of claim 15, wherein the request for the subscription and the notification of the expiration of the subscription is received from a network function through a front end, wherein the subscription period is negotiated with the front end, and wherein the notification is provided to the network function through the front end.

17. The non-transitory computer-readable storage medium of claim 15, wherein the request for the subscription and the notification of the expiration of the subscription exceeds a maximum subscription period associated with the subscription, and wherein the subscription period is based on the maximum subscription period associated with the subscription.

18. The non-transitory computer-readable storage medium of claim 15, wherein the instructions further cause the computing system to:
   provide notifications associated with changes to subscription-related data corresponding to the subscription during the subscription period, wherein notifications are not provided after the expiration of the subscription.

19. The non-transitory computer-readable storage medium of claim 15, wherein the notification is provided at a time prior to the expiration of the subscription, and wherein the time prior to the expiration of the subscription is set based on the request for the subscription.

20. The non-transitory computer-readable storage medium of claim 15, wherein the request for the subscription the notification of the expiration of the subscription are included in a structured data object.

* * * * *